United States Patent [19]

Carstens

[11] 4,240,768
[45] Dec. 23, 1980

[54] TRANSPORT SYSTEM WITH BLOCKING VALVE CONTROL

[75] Inventor: Marion R. Carstens, Atlanta, Ga.
[73] Assignee: Georgia Tech Research Institute, Atlanta, Ga.
[21] Appl. No.: 785,648
[22] Filed: Apr. 7, 1977

Related U.S. Application Data

[63] Continuation of Ser. No. 628,104, Nov. 3, 1975, abandoned.
[51] Int. Cl.³ .............................................. B65G 51/10
[52] U.S. Cl. ....................................... 406/19; 406/105; 406/192
[58] Field of Search .................... 243/1, 2, 3, 6, 36, 243/38; 302/23, 24, 25; 104/138 R, 155; 406/19, 105, 192

[56] References Cited

U.S. PATENT DOCUMENTS

| 1,753,987 | 4/1930 | Hohne | 243/6 |
| 3,404,638 | 10/1968 | Edwards | 104/138 R |
| 3,556,603 | 1/1971 | Liebenberg | 243/6 |
| 3,797,405 | 3/1974 | Carstens et al. | 243/6 |

FOREIGN PATENT DOCUMENTS 496186 11/1938 United Kingdom ............ 243/6

Primary Examiner—Jeffrey V. Nase
Attorney, Agent, or Firm—Newton, Hopkins & Ormsby

[57] ABSTRACT

A pump which generates pressurized air flow in a pipeline to sweep wheeled vehicles along with the air flow is provided with a flow control mechanism. First and second blocking valves which normally prevent reverse flow of air in the pipeline but which can alternately swing open to allow a vehicle to pass are automatically moved between open and closed positions by altering the pressure differential acting on the valves. The valves are urged to the open position and air flow control mechanism associated with the pump alternately directs air against the back of the valves in response to the position of a vehicle to sequentially operate the valves to move the vehicle through the pump.

9 Claims, 8 Drawing Figures

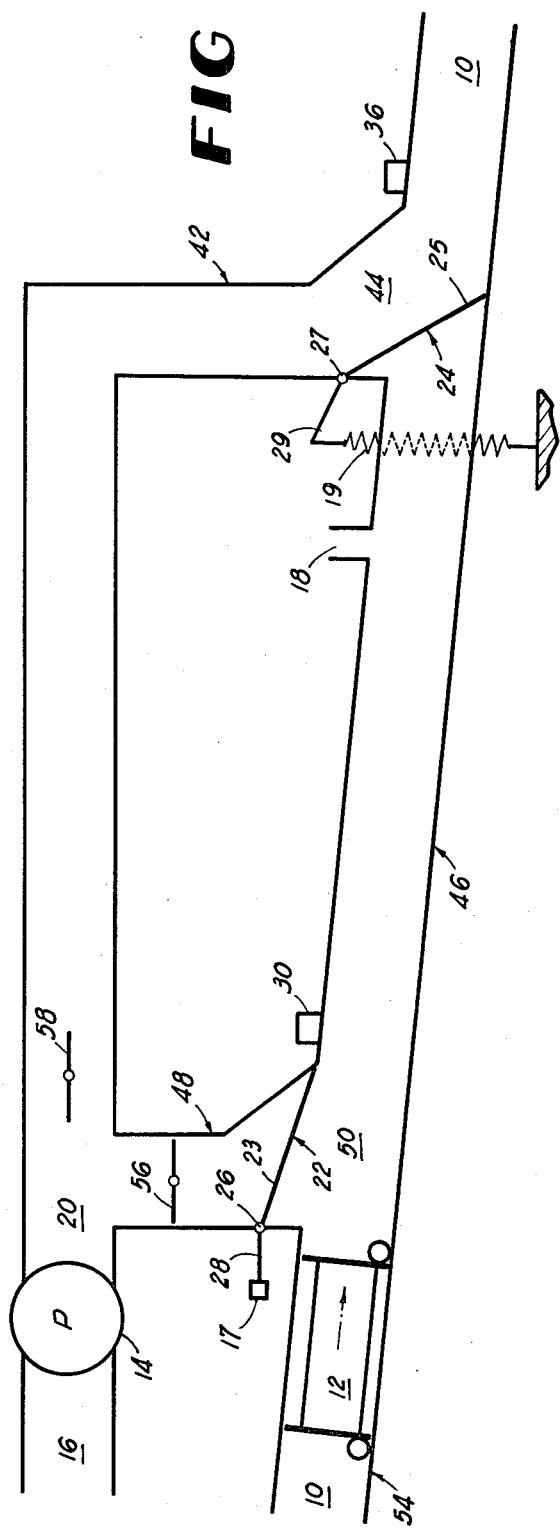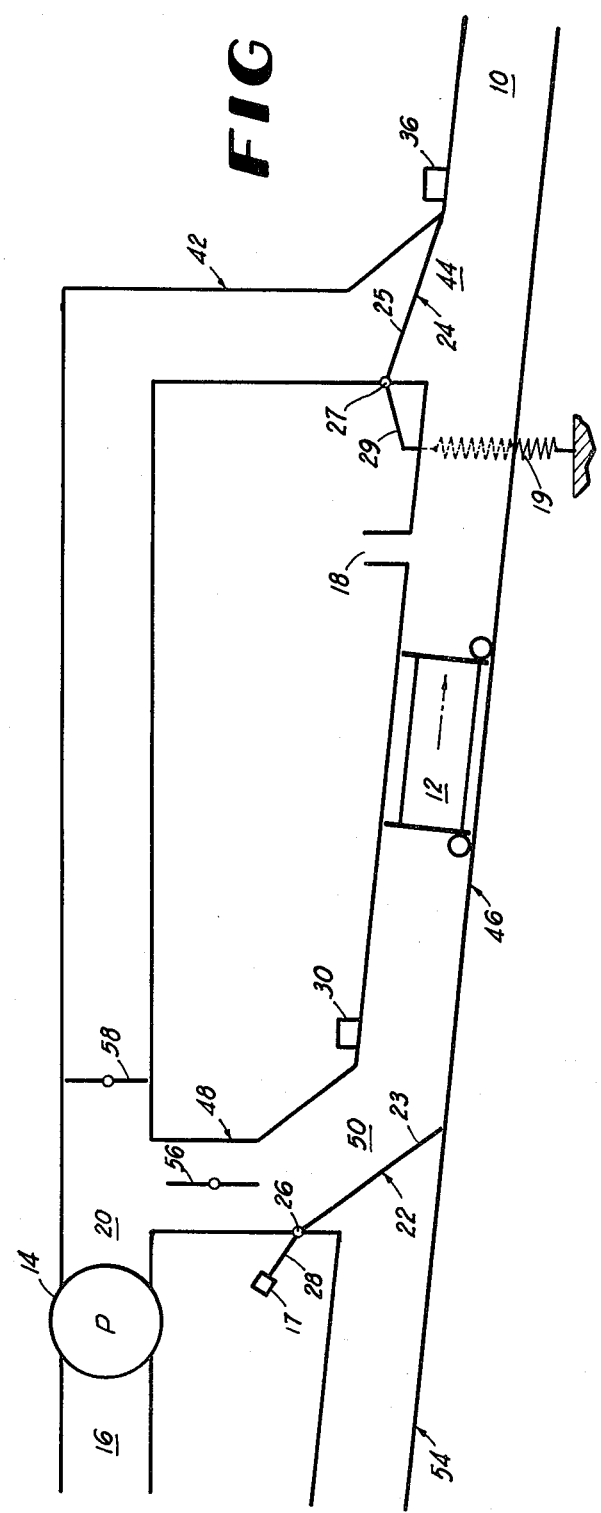

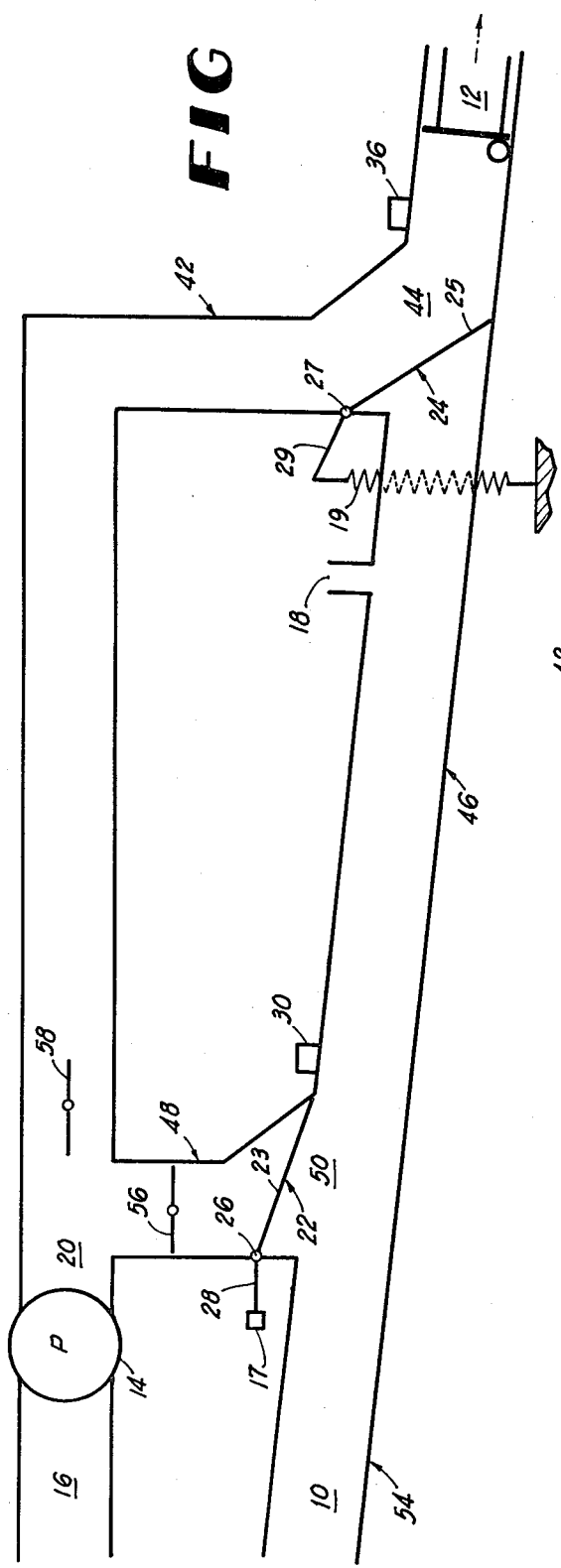
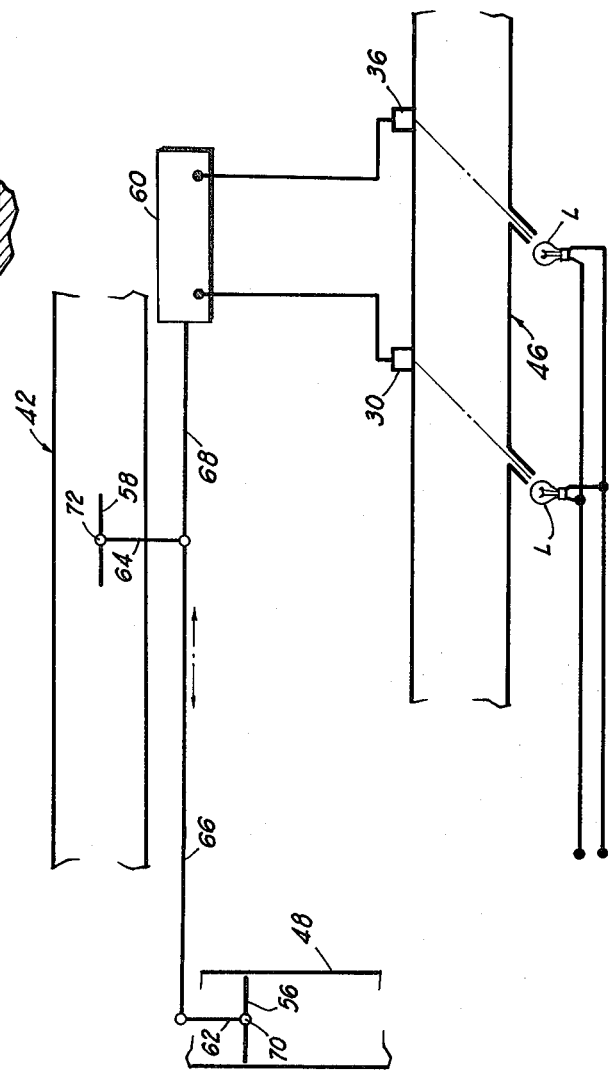

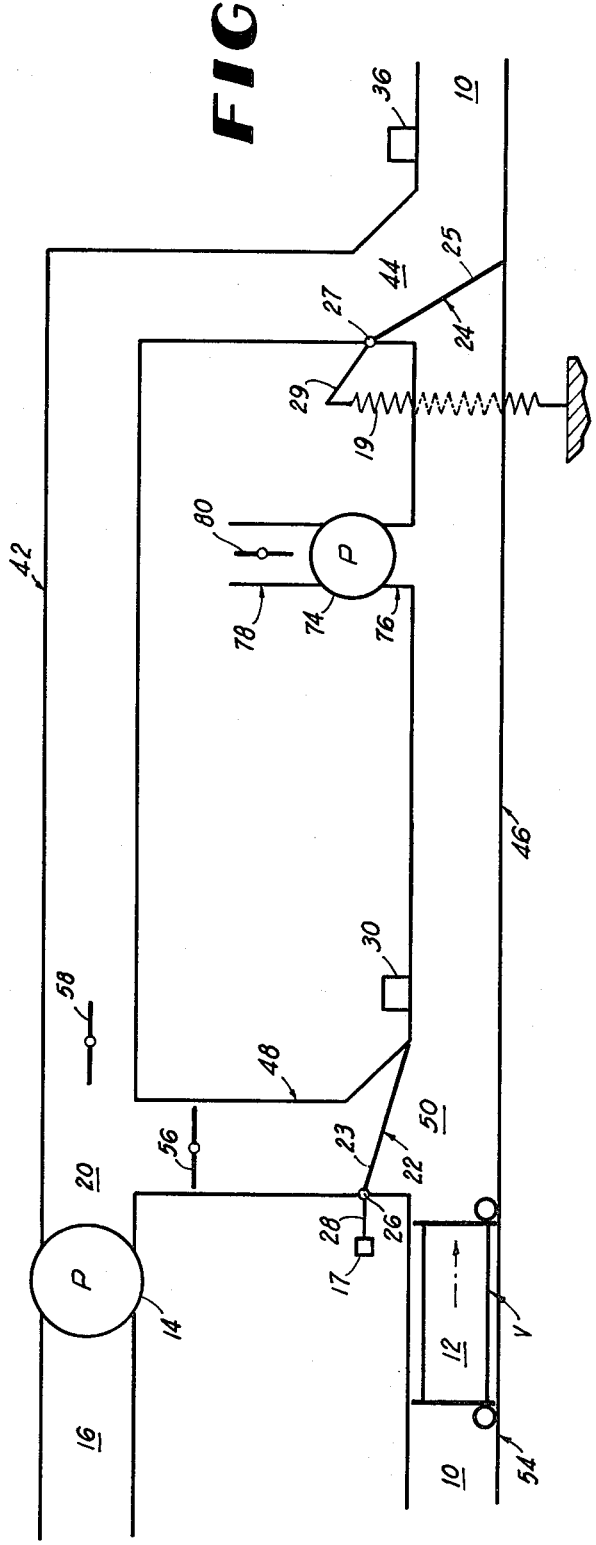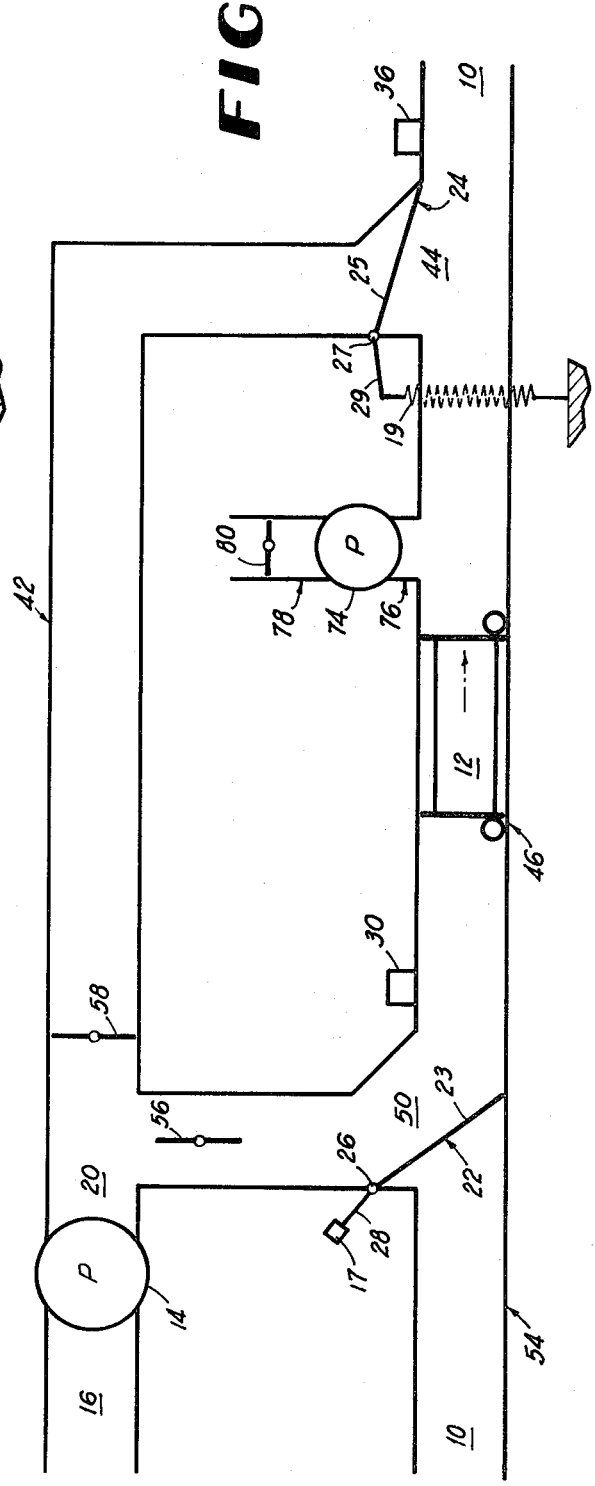

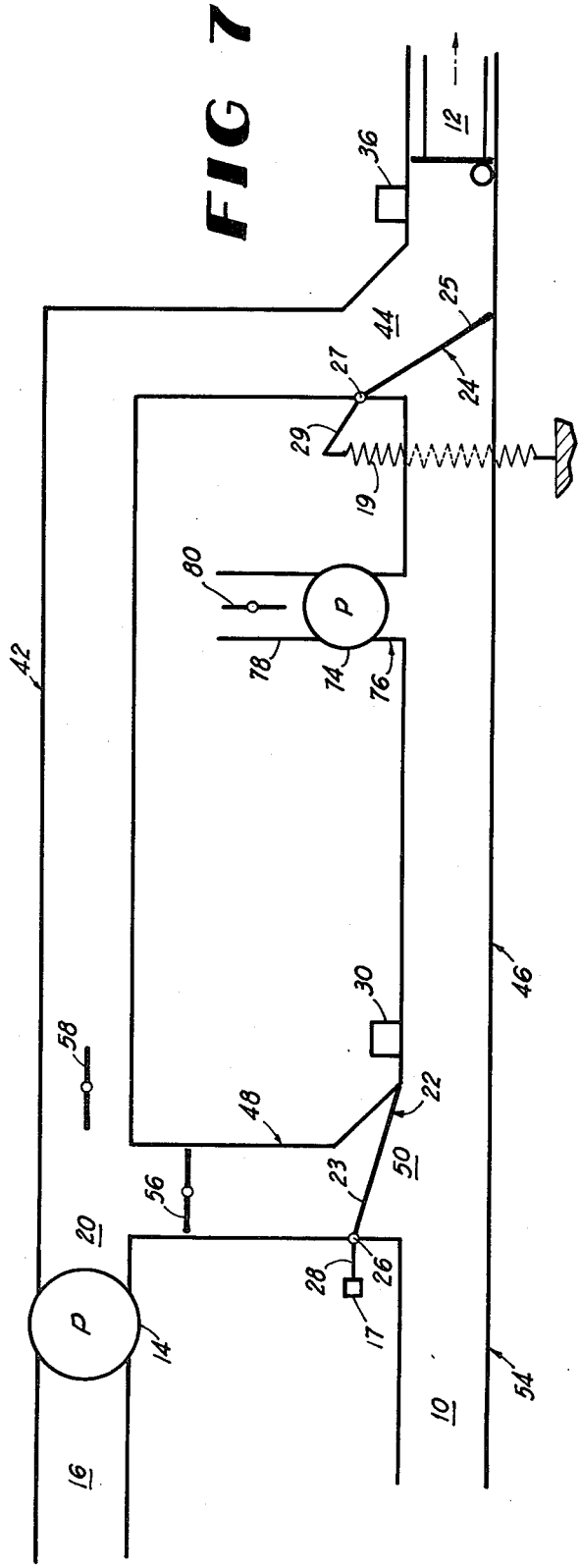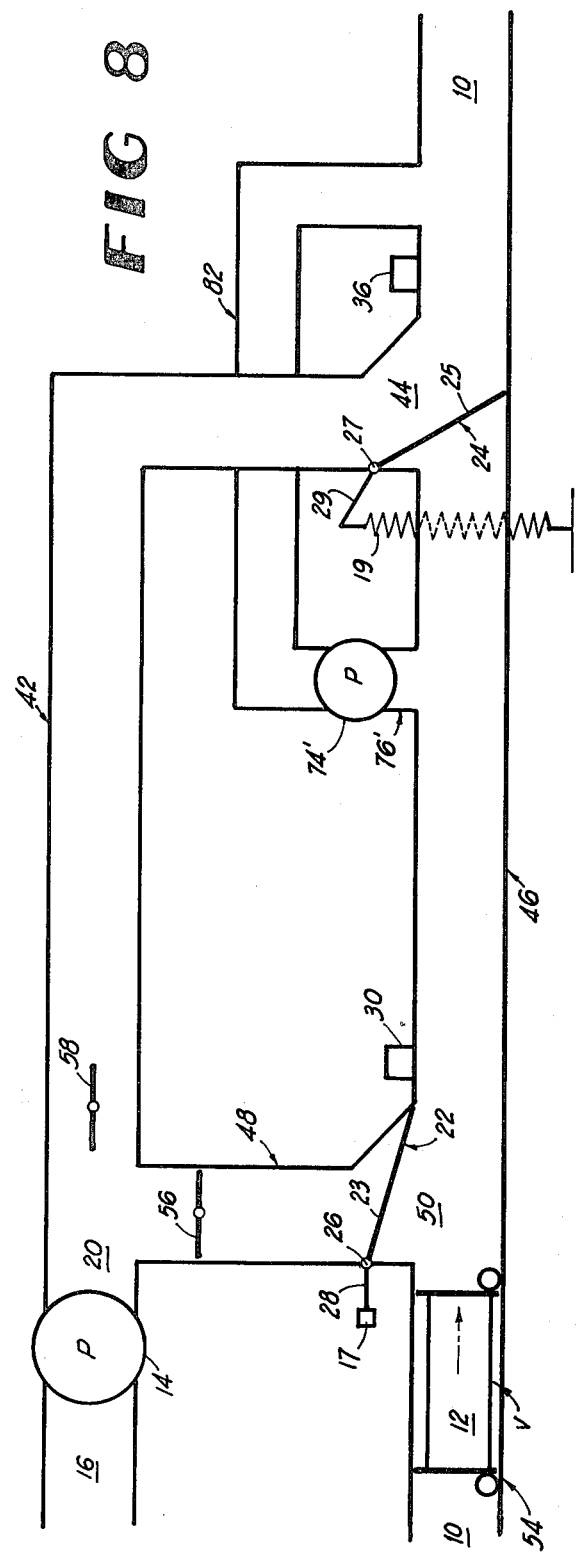

TRANSPORT SYSTEM WITH BLOCKING VALVE CONTROL

This is a continuation of application Ser. No. 628,104, filed Nov. 3, 1975, now abandoned.

BACKGROUND OF THE INVENTION

This invention relates to transport systems such as those disclosed in copending application Ser. No. 545,339, filed Jan. 30, 1975, now U.S. Pat. No. 4,012,039, and in U.S. Pat. Nos. 3,724,691 of Apr. 3, 1973; 3,797,405 of Mar. 19, 1975; and 3,881,425 of May 6, 1975.

In the above systems, a wheel-supported vehicle or a train of them moves through a conduit system through which air is pumped. Each vehicle incompletely fills the cross section of the conduit system and presents a high coefficient of drag with respect to the air being pumped through the conduit system. The air flow is maintained at a high mass rate of flow and vehicles are swept along by this flow of air.

In the development of these systems, several types of air pumps were employed. One type, as disclosed in U.S. Pat. No. 3,797,405, may be regarded as a jet type of pump in which air is withdrawn from the conduit system and discharged back into the conduit system through what is effectively a restriction or nozzle, the resultant high velocity of the jet stream discharge being partially converted, downstream of the discharge region, into a pressure component which creates or maintains the requisite momentum for the high mass rate of flow. Although this type of pump system is low cost and reliable, the amount of air which can be withdrawn from the conduit system and then reintroduced thereinto under high velocity, is limited to a fraction of the total flow in the conduit system in order to avoid a "dead spot" or any tendency for reverse flow in the conduit system between the regions of air withdrawal and reintroduction by the pump. Consequently, in order to provide a system having high total energy input with this type of pump, a large number of them are required in series along the pipeline or conduit system.

Subsequent developments involved the use of pumps which develop the requisite air momentum not by a high velocity jet stream discharge but by directly discharging the high mass rate of flow into the conduit system, thereby creating a tendency for the air to flow reversely or in upstream direction from the region of introduction. The air inducted by the pump may either be withdrawn from the conduit system or it may be ambient air, depending upon whether the pump is employed as a booster along the conduit system or whether it operates as an end-of-line pump. In any event, some physical obstruction is required immediately upstream from the region of air introduction to prevent air reversal through the conduit. In U.S. Pat. No. 3,881,425, the vehicles themselves are used for this purpose and in order to move the vehicles to a point beyond or downstream of the region of air introduction or discharge in order to get them moving within the conduit system, a mechanical drive unit may be employed. Although this type of system is very efficient, it does require the complexity and disadvantage of a mechanical drive unit of some kind and also imposes a program of vehicle movement through the system.

In order to eliminate the constraints of the immediately foregoing systems, a further pump arrangement was developed, as disclosed in application Ser. No. 545,339. In such systems, the physical obstruction required to prevent any significant reverse flow of air is provided by an overhead-suspended, counterbalanced flapper valve which is responsive to the phenomenon of an approaching vehicle automatically to swing upwardly out of the way of the vehicle, allowing it to pass therebeyond and back into the mainstream of the moving air mass. The valve closes automatically behind the vehicle or train.

The present invention is directed to systems using two valves which allow still greater pressure differentials to be employed. While U.S. Pat. No. 1,753,987 describes a system using two valves for moving a postal capsule, such a system is unsatisfactory for moving wheeled vehicles.

BRIEF SUMMARY OF THE INVENTION

The present invention is directed to a transport system in which two overhead-suspended flapper valves are employed to provide the physical obstruction necessary to prevent any substantial reverse flow of air upstream from the region of air discharge of a pressure pump. In contrast to my prior arrangements, the pressure differential change across the valves which is the phenomenon by means of which the valves are swung upwardly to clear a vehicle is not created by an entrapped mass of air ahead of a vehicle, but is instead created by a pump-induced air flow change itself.

Basically, the present system employs two overhead-suspended, openly urged valves upstream from the region of the pressure pump discharge into the pipeline or conduit system, the air flow being alternately directed against the valves such that a pressure differential is developed across the valves to alternately close the valves in combination with sensor means responsive to the approach of an incoming vehicle or train for causing an alteration in air flow which changes the pressure differential across the valves which opens and closes the first and second valves alternately. The pump or air-displacing means may be a booster type pump which withdraws the full system air from one region of the conduit system and discharges it back into a second region of the conduit system or it may be an end-of-line type of pump or air displacing means in which ambient air is inducted and pressurized air is discharged into the pipeline.

The air displacing means includes two discharge outlets connected to spaced regions of the pipeline, each for directing air against the back of and actuating a swingable flapper valve. One or the other of these discharge outlets is blocked by a suitable air flow control valve and the two are linked together by a common actuating mechanism such that in a normal position, one outlet discharges into the pipeline while the other is blocked but wherein this situation is reversed in response to the detection of an approaching vehicle. Auxiliary pump means having an inlet connected to the pipeline between the first and second valves may be provided to further assist in the movement of vehicles through the pump.

BRIEF DESCRIPTION OF THE DRAWING FIGURES

FIG. 1 is a diagrammatic illustration of an embodiment of the invention and illustrating an end-of-line system;

FIG. 2 is a view similar to FIG. 1 but showing the control means in altered positions;

FIG. 3 is a view similar to FIGS. 1 and 2 but showing the operation after the vehicle passes the pump section;

FIG. 4 is a diagrammatic view illustrating control valve actuation for the embodiment of FIG. 1;

FIG. 5 is a diagrammatic view illustrating another embodiment of the invention, this time again in an end-of-line configuration;

FIGS. 6 and 7 are views similar to FIG. 5 but illustrating the passage of the vehicle through the system; and FIG. 8 is a diagrammatic view of a further embodiment of the invention.

DETAILED DESCRIPTION OF THE INVENTION

With reference at this time to FIG. 1 in particular, the reference character 10 indicates in general a continuous pipeline or conduit system through which wheeled vehicles pass freely in the direction of the arrow indicated by the reference character 12. Air-displacing means 14 which may take any convenient conventional form is provided with an inlet 16 through which air is inducted and having an outlet 20. The device 14 is adapted to displace air at a high mass rate of flow and at a pressure differential between the inlet and outlet thereof to establish a high mass rate air flow of air through the pipeline 10 as is disclosed in my aforesaid prior U.S. Pat. No. 3,797,405.

A wheeled vehicle v is shown approaching the pump station and, as will be understood from my prior disclosures mentioned hereinabove, this vehicle only incompletely fills the cross section of the pipeline 10 and is so shaped as to have a high coefficient of drag with respect to the air flowing through the system so that even though the air flows around and past the vehicle, the vehicle is swept along by the high mass rate flow of air sweeping through the system.

FIGS. 1, 2 and 3 are intended to illustrate a basic principle of this invention, namely, the control of air flow generated by the pump means 14 so as to allow first valve 22 and second valve 24 to move from a closed position to an out-of-the-way open position allowing unimpeded movement of the vehicle v therepast without in the process requiring either the momentum of the vehicle to build up air pressure ahead of it in order to open the valves or the vehicle to contact the valves 22 and 24. To this end, air ahead of the vehicle v passes outwadly through a vent 18 to prevent pressure build-up such as would slow the vehicle.

The overhead-suspended flapper valves 22 and 24 are provided in order to prevent reverse flow of air from the pump outlet 20 back in the direction of the approaching vehicle. Valve 22 is supported from a pivot axis 26 and is connected to an arm 28, which is illustrated only in FIG. 2 for clarity, to which counterbalancing means such as a weight or a spring is attached, here shown as weight 17, for counterbalancing the valve 22 normally to urge it or to allow it easily to swing to an open position when the pressure differential created normally by the pump means is altered. Similarly, valve 24 is supported from pivot axis 27 and is connected to an arm 29 to which counterbalancing means such as a weight or spring, here shown as spring 19 outside said conduit, is attached for counterbalancing the valve 24 and urging valve 24 to swing to an open position. The edges of both valves 22 and 24 are molded to match the contour of the inside pipe wall in order to seal against the inside of the pipeline 10 when moved to the closed position.

Referring to FIG. 1, an end-of-line type of pump station is illustrated in which air flow control means is associated with the pump 14 for alternately directing air against the backs 23 and 25, respectively, of valves 22 and 24 to control their opening and closing relative to the position of vehicle v. The outlet 20 of the pump 14 has two branches, the first branch 48 discharges into the region 50 of the pipeline 10 and the second branch 42 discharging into the region 44 of the pipeline 10. It is noted that regions 50 and 44 open into the top of pipeline 10 and therefore do not interfere with the wheels of vehicle v. It is also noted that regions 50 and 44 are positioned to direct air on the back of valves 22 and 24, respectively, for closing said valves by establishing a pressure differential across the valves which alternately maintain them in the closed position thereby preventing any substantial reverse flow of air past the valves 22 and 24. Flow of air from the pump 14 alternately to branch 48 and 42 is controlled by any suitable means such as butterfly valves 56 and 58, respectively. As shown in FIG. 1, butterfly valve 56 is blocking branch 48 preventing air from pump 14 flowing into region 50 and therefore first valve 22 is urged to an open position by its counterbalancing means 17. However, butterfly valve 58 is in the open position allowing air to flow from pump 14 through branch 42 and into region 44 and against the back 25 of valve 24 thereby moving valve 24 to the closed position. Therefore, air flows from the pump 14 through branch 42 and past closed valve 24 downstream in the pipeline 10 to move any vehicles v in the line 10 downstream of valve 24 through the pipeline 10, but yet prevents reverse flow of air through valve 24.

The pipeline end section 54 is preferably downwardly inclined to let the vehicles v roll by gravity into the pipeline and past the open valve 22 and into the section 46 of the pipeline between the regions 44 and 50. In order to prevent air being trapped ahead of the vehicle and between closed valve 24, an air vent 18 is provided. As soon as the vehicle approaches section 46, as in FIG. 2, a detector or sensor 30 positioned therein operates a suitable actuating means, which will be more fully described hereinafter, to operate the two valves 56 and 58 from the positions shown in FIG. 1 to the positions shown in FIG. 2. Thus, now all of the air displaced by the device 20 is diverted into the pipeline 10 through the branch 48, reverse flow escape thereof being prevented by the valve 22 which has been closed by the air flow through branch 48 and is now held positively in the closed position. At the same time, the pressure differential which existed across the valve 24 in FIG. 1 which tended to maintain it in the closed position is now changed such that this changed pressure differential now causes the valve 24 to attain the full open position as is illustrated in FIG. 2. Thereafter, the vehicle v passes the region 44 and in so doing passes beneath the valve 24 ultimately to reach the position of a detector 36 which now causes the actuator to revert the valves 56 and 58 to their original positions as is shown in FIG. 3.

FIG. 4 illustrates in diagrammatic form the fashion in which the two butterfly valves 56 and 58 are actuated between the position shown in FIGS. 1, 2 and 3. As illustrated in FIG. 4, a common actuator of any conventional form and as is indicated by the reference character 60 is controlled by the detectors 30 and 36 and the two valves 56 and 58 are provided with crank arms 62 and 64 which are pivotally interconnected by a link 66 and are also connected to the actuator rod 68 of the device 60. The device 60 is adapted to move its rod 68 back and forth in the fashion indicated by the double headed arrow in FIG. 4 correspondingly to pivot the valves 56 and 58 about their axes 70 and 72 between the positions indicated in FIGS. 1 and 2. The actuator may be of any suitable form and as illustrated is double acting, same being energized to act in one direction in response to a signal from the detector or sensor 30 and in the opposite direction in response to a signal from the detector or sensor 36. The detectors 30 and 36 can be of any conventional type as, for example, they may be photo-detector devices as illustrated in FIG. 4 operative to be actuated to produce an output signal when the vehicle v passes the light beams from the lamps L normally incident thereon. Each lamp/detector pair is staggered as shown so that any gap between successive vehicles of a vehicle train will not allow the light beam to pass.

In the embodiment of FIGS. 5-7, the apparatus is the same as is described in conjunction with FIGS. 1-3 but, in this instance, an auxiliary pump 74 is provided having an inlet 76 connected between the two valves 22 and 24 in place of vent 18. The outlet 78 of this pump 74 is provided with a valve 80 which is movable between the full open position shown in FIG. 5 to the fully closed position shown in FIG. 6. When the valve 80 is in the fully open position as shown in FIG. 5, the auxiliary pump 74 withdraws air from the section between the valves 22 and 24 which, although it is less than the flow through the branch 42, nevertheless is of sufficient flow rate as to create a pressure differential across the valve 22 which maintains it in the upwardly swung, open position and acts to draw vehicle v through the line 10 as is shown in FIG. 5. An approaching vehicle, then, can freely pass beneath the valve 22. As soon as the vehicle passes the position of the sensor 30, the actuator means for the valves 56 and 58 which is also connected to the valve 80 moves these several valves to the position shown in FIG. 6, thus discharging air through the branch 48 and moving the vehicle along with it and, at the same time, upsetting the pressure differential previously across the valve 24 and now moving it to the upwardly swung or open position as is illustrated in FIG. 6 while closing valve 22.

As soon as the vehicle passes the second sensor 36, the actuator means reverse the valves to their original positions, as is illustrated in FIG. 7.

In the embodiment shown in FIG. 8, the arrangement is generally similar to that illustrated in FIGS. 5-7. However, in this case, the auxiliary pump 74' has its inlet 76' connected between the two valves 22 and 24 but in this case its outlet 82 discharges downstream from the branch 42, the capacity of the pump means 74' being but a fraction of the flow of the main pump. Thus, when the valves 56 and 58 are reversed in their positions and flow is downwardly through the leg 48 of the main pump 38, the auxiliary pump 74' cannot sustain the pressure differential which maintained the valve 24 closed and, instead, the pressure differential across this valve 24 alters or changes so that it moves to the upwardly swung position while, at the same time, valve 22 swings downwardly to the closed position behind the entering vehicle. The detectors 30 and 36 operate in the same fashion as previously described.

With the systems according to the present invention, the main pump 14 in each case can be operated at pressure differentials correspondingly to produce high mass rates of flow whereby the vehicles which are heavily laden can be adequately moved through the pipeline system. At the same time, the momentum of the vehicle is minimally disturbed by the blocking valves 22 and 24 associated with the pumping stations and, instead, a change of flow in the system is effective to produce the phenomenon which alters the pressure differentials across the blocking valves 22 and 24 to move them back and forth between their closed and opened positions.

It will be appreciated that the basic principle of this invention involves air flow control in the vicinity of the two openly urged flapper valves 22 and 24 which adjusts the pressure differential alternately across the valves either to close them or to allow them to swing to open position.

What is claimed is:

1. In a transport system including a continuous conduit for conveying wheeled vehicles therein, at least one wheeled vehicle within said conduit, and pump means for discharging pressurized air into said conduit, the combination of:
   a first overhead-suspended swingable valve adapted to move between a closed position blocking off said conduit and an open position permitting a vehicle to sweep past,
   a second overhead-suspended swingable valve downstream of the first valve adapted to move between a closed position blocking off said conduit and an open position permitting a vehicle to sweep past, said first and second valves being spaced from each other,
   vent means connected to the conduit between said first and second valves,
   opening means urging said first and second valves to the open position,
   air flow control means associated with said pump means and positioned for alternately directing air into the upper portion of the conduit and against the back of the first valve to close said first valve behind a vehicle while allowing said second valve to open under the action of said opening means ahead of said vehicle and directing air into the upper portion of the conduit and against the back of the second valve to close said second valve behind said vehicle while allowing said first valve to open under the action of said opening means, and
   means responsive to the position of said vehicle for actuating said air flow control means.

2. The system of claim 1 wherein said vent means includes auxiliary pump means having an inlet connected to the conduit between said first and second valves.

3. The system of claim 2 wherein said auxiliary pump means includes an outlet connected to said conduit downstream of the second valve.

4. The system of claim 2 wherein said auxiliary pump means includes a valve controlled by the means actuating said air flow control means.

5. The system of claim 1 wherein the conduit upstream of the first valve is inclined downwardly towards the first valve.

6. The system of claim 1 wherein said opening means comprises a weight acting to urge each said valve toward open position.

7. The system of claim 1 wherein said opening means comprises a spring acting to urge each said valve toward open position.

8. The system of claim 1 wherein each valve when moved to the closed position seals against the inside wall of the conduit.

9. The system of claim 1 wherein the air flow control means is connected to the top of the conduit to direct air to the conduit and against the backs of said valves and said valves are pivotally suspended adjacent the upstream side of said connection of the air flow control means and the conduit.

* * * * *